May 22, 1923. 1,456,457
A. G. MOLNIAR
AUTOMOBILE AND TRUCK TURNER
Filed July 2, 1921 2 Sheets-Sheet 2
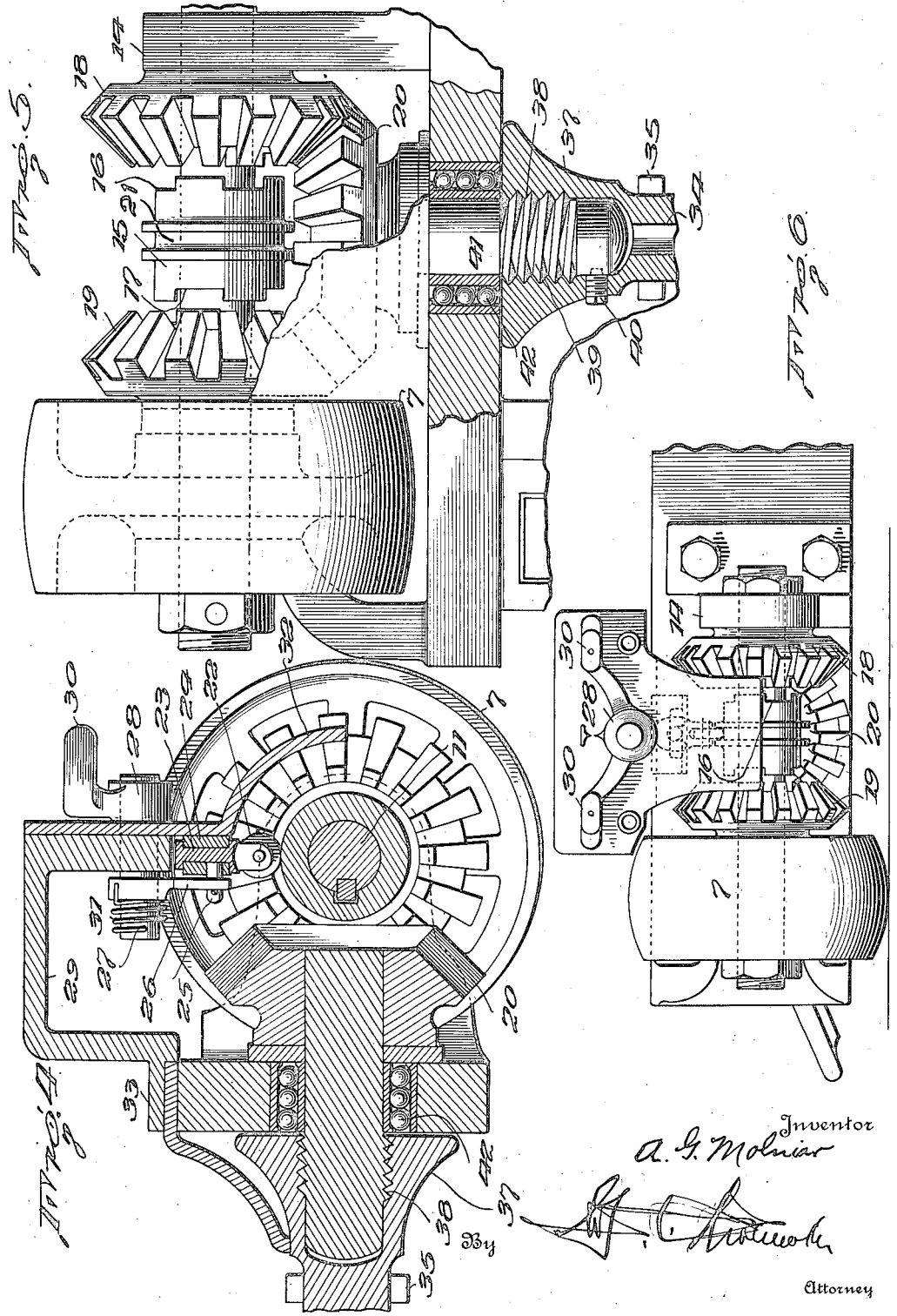

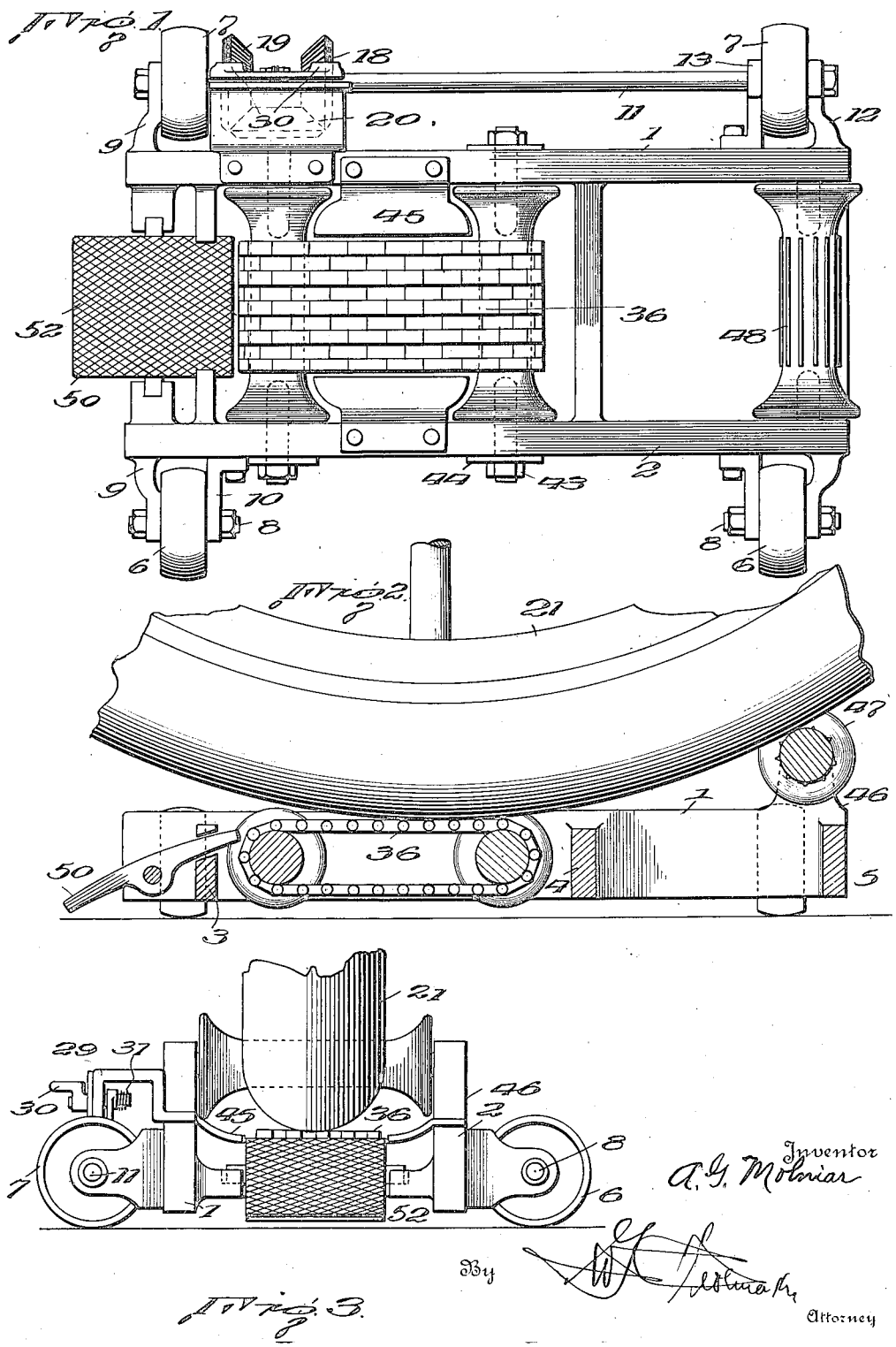

Patented May 22, 1923.

1,456,457

UNITED STATES PATENT OFFICE.

ALBERT GEORGE MOLNIAR, OF ALBION, MICHIGAN.

AUTOMOBILE AND TRUCK TURNER.

Application filed July 2, 1921. Serial No. 482,064.

*To all whom it may concern:*

Be it known that I, ALBERT GEORGE MOL-NIAR, a citizen of the United States, residing at Albion, in the county of Calhoun and State of Michigan, have invented new and useful Improvements in Automobile and Truck Turners, of which the following is a specification.

The invention relates to an automobile and truck turner.

The object of the present invention is to provide a simple, practical and efficient device of strong, durable and comparatively inexpensive construction, designed for use in garages and various other places and adapted to receive readily the rear wheels of an automobile, truck or other motor vehicle and capable of being readily operated by the power of the same, for turning an automobile, truck or the like, in any garage or for handling the machines for repair, storage or the like, or in rapidly removing them from a building or the like in the event of fire or other danger.

A further object of the invention is to provide a automobile and truck turner of this character which is portable and adapted to be readily transferred from one place to another and which may be readily controlled to change its direction for moving an automobile, truck or the like.

With these and other objects in view, the invention consists in the novel construction, combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings in which like characters of reference designate corresponding parts in the several figures:

Figure 1 is a plan view of an automobile and truck turning device constructed in accordance with this invention.

Figure 2 is a longitudinal sectional view of the same.

Figure 3 is a front elevation of the device.

Figure 4 is an enlarged vertical sectional view of the clutch mechanism for controlling the direction of the device.

Figure 5 is a horizontal view of the same, partly in section and partly broken away to show the gearing.

Figure 6 is a side elevation of the clutch mechanism.

Referring to the drawings in which is illustrated the preferred embodiment of the invention, 1 designates a horizontal wheeled frame designed to be constructed of any suitable material preferably cast metal and composed of spaced parallel side bars 2 and connecting cross bars 3, 4 and 5 formed integral with the side bars. The size and strength of the frame will vary with the character and use to which the device is intended to be put. The frame is equipped at opposite sides with transversely disposed supporting wheels 6 and 7 which rotate on axes disposed longitudinally of the frame and the automobile or truck when the latter is arranged on the frame so that when motion is imparted to the device as hereinafter explained the truck or automobile will be moved laterally in either direction whereby such machine may be quickly turned and arranged to be driven in any direction under its own motive power. In practice a pair of the devices will be employed, one for each rear wheel of an automobile, truck or other motor vehicle, of this character and the wheels 6 are mounted on the shafts or axles 8 supported in brackets 9 and 10 arranged at the inner and outer sides of the side wheels 6. The outer brackets 9 are preferably cast integral with the frame 1, while the inner brackets are preferably constructed separate from the frame and bolted or otherwise secured to the same in proper spaced relation with the fixed brackets to receive side wheels of the required size. The shafts or axles 8 may be secured in the brackets 9 and 10 by any suitable means.

The other side wheels 7 are mounted on a longitudinal shaft or axle 11 extending substantially the entire length of the frame in spaced relation with the adjacent side thereof and supported by brackets 12, 13 and 14. The brackets 12 are arranged at the outer sides of the side wheel 7 and are formed integral with the adjacent side of the frame. The other brackets 13 and 14 are constructed separate from the frame 1 and the bracket 13 is located adjacent the inner side of one of the side wheels 7 as clearly shown in Figure 1 of the drawings. The other bracket 14 is spaced from the other side wheel 7 to provide an intervening space to receive clutch mechanism and gearing.

The longitudinal shaft or axle 11 may be secured in the brackets by any suitable means.

The clutch comprises a movable clutch member slidably interlocked with the shaft or axle 11 by a key or the like and it is provided at its ends with clutch faces 16 and 17 engaging corresponding clutch faces of spaced gear wheels 18 and 19 which mesh with a gear wheel 20 which is driven by the means hereinafter described from the rear wheel 21 of an automobile or other motor vehicle and when rotated imparts rotary movement to the gear wheels 18 and 19. The gear wheel 18 which meshes with the gear wheel 20 at one side thereof rotates in the opposite direction from the gear wheel 19 which is meshed with the gear wheel 20 at the opposite side thereof. By this arrangement the shaft or axle 11 which may be clutched to either of the gear wheels 18 and 19, may be rotated in either direction.

The clutch member 15 is provided with a central annular groove 21 which is engaged by a roller 22 of a slide 23 mounted in a suitable guide 24 and provided with a pivot pin or lug 25 which is connected to an arm 26 of a shaft or pivot 27 of a clutch operating lever 28. The clutch operating shaft or lever 28 which is mounted in a bracket 29 is provided with opposite arms having terminal portions 30 adapted to be depressed by the foot of the operator to swing the arm 26 and slide the clutch member to one side or the other to engage the said clutch member with one of the gear wheels. The slide or member 23 which carries the roller 22 is forked at the lower portion to receive the said roller 22 and it is oppositely recessed at the upper portion as clearly shown in Figure 6 of the drawings to receive the guide 24 which is preferably composed of spaced members or plates as shown. The pin or lug 25 to which the arm 26 is connected, preferably extends through a slot in one of the plates of the guide 24. The arm 26 which is mounted on the shaft or pivot 27 of the lever 28 is preferably yieldably connected with the same by a coiled spring 31 disposed on the shaft or pivot 27 and having one end connected to the same and the other end connected to the said arm 26. The clutch lever may be quickly depressed at either side and the yieldable connection afforded by the spring 31 will permit the slide to be actuated by the spring without liability of injury by such repeated operation. As the coiled spring 31 will be placed under tension by the movement of the clutch lever in either direction the slide will be properly operated when the clutch lever is depressed at either side. The bracket 29 is mounted on and suitably secured to the adjacent side bar of the frame 1 and it carries a depending plate 32 curved over the clutch and arranged between the spaced ears for protecting the clutch mechanism and to prevent the foot of the operator from accidentally coming in contact with the same. The bracket 29 is approximately U-shaped, being composed of inner and outer vertical portions and a top connecting portion and it is provided at its inner portion with an attaching flange 33 which is secured to the said frame 1.

Mounted between the spaced sides of the frame 1 are transverse rollers 34 composed of central and side portions, the central portions of the portions 34 being provided with projections 35 for engaging a link belt 36 adapted to receive the wheel 21 of the automobile truck or the like. The rear wheel 21 is adapted to be supported by and seated upon the link belt 36 of the drawings and when the rear wheel is rotated, motion will be communicated to the endless link belt and to the transverse rollers. The end portions 37 of the transverse rollers are tapered and present concave faces to the wheel and are of greater diameter than the central portions of the transverse rollers and are adapted to cause the wheel 21 to slide downwardly and inwardly upon the belt should the wheel run upon either of the end portions of either of the transverse rollers. The enlarged tapered end portions of the transverse rollers are hollow and interiorly threaded at 38 to receive threaded portions of journals 39 which after being screwed into the terminal portions of the rollers are secured by set screws 40. The screws 40 are mounted in threaded perforations of the terminal portions of the transverse rollers and engage sockets or recesses in the journals. The journals have smooth portions 41 which are supported by ball bearings 42 in suitable openings in the sides of the horizontal frame 1. One of the journals has mounted on it a gear wheel 20 and the other journals are threaded for the reception of nuts 43. Washers 44 are arranged on the journals at the outer sides of the frame for retaining the ball bearings in position and they are secured in place by the nuts 43 and by the gear wheel 20. Any other suitable means may, of course, be employed for this purpose. The sides of the frame 1 are provided between the transverse bolt carrying rollers with guard plates 45 which are curved downwardly and forwardly to present upper concave faces to the wheel 21. These plates 45 are also adapted to direct or guide the wheel 21 to the link belt should the wheel ride upon either of the plates 45.

The frame 1 is provided at opposite sides of its inner or rear end with projections 46 having openings for the reception of journals 47 of a transverse roller 48 located above the plane of a link belt and the rollers thereof and adapted to form a stop for the rear wheel as indicated in Figure 3 of the drawing. The journals 47 of the roller 48 are constructed separate from the roller and the latter has tapered terminal portions which present concave surfaces to the wheel for guiding the same to the central portion of the stop roller 48. The frame is provided at its front end with an approach plate 50 mounted on a transverse pivot 51 and arranged at an inclination and adapted to tilt to accommodate itself to the rear wheel in running the same upon the device and in guiding the rear wheel to the chain seat. The pivot is mounted in suitable bearings at the sides of the frame and the upper surface 52 of the plate 50 is preferably roughened to prevent the wheel from slipping and to enable the wheel to grip the plate and readily ride up the same onto the link belt.

In practice, a pair of the devices shown in Figure 1 will be employed and an automobile or truck will be run upon the same. The devices may be connected together by any suitable means and the power of the automobile or truck will be transmitted to the devices and the rear of the machine will be moved laterally of the same in one direction or the other according to the position of the clutching element or member 15. The transverse arrangement of the wheels of the frame of the device will enable the automobile or truck to be readily run onto or off of the device as there will be no liability of the device being pushed forwardly or rearwardly by the automobile and after the automobile or truck has been moved to the required position, the clutch member 15 is moved out of engagement with the gear wheels for enabling the automobile to be operated independently of the mechanism of the device. The device may be readily transferred from one place or point to another and it will enable automobiles or trucks to be quickly and conveniently handled in a garage or other place and in the event of fire or other cause for hurried removal of the machines from a garage or other place, the device will enable the machines to be rapidly turned and arranged in proper directions so that they may be run out of such place without interfering with one another by blocking the passage because of being arranged in the wrong position for passing outward through the same.

What is claimed is:

1. A motor vehicle turning device including a wheel frame adapted to receive the drive wheel of a motor vehicle and having supporting wheels arranged transversely with relation to the wheel of the motor vehicle and means for transmitting motion from the drive wheel of the vehicle to the said transversely disposed wheels, said means including clutch mechanism for enabling the device to be moved laterally in either direction.

2. A motor vehicle turning device including a frame provided with side supporting wheels arranged in pairs and disposed transversely to enable the frame to be moved laterally, a longitudinal shaft mounted on the frame and carrying two of the side wheels, spaced gears also mounted on the said shaft and having clutch faces, a slidable clutch element interlocked with the shaft and arranged between and adapted to engage either of the said gears, an endless wheel receiving element mounted on the frame and a gear actuated by the said element and meshing with the said gears.

3. A motor vehicle turning device including a wheeled frame having its wheels disposed transversely for permitting the frame to be moved laterally, an endless wheel receiving element forming a seat for the drive wheel of a motor vehicle, transversely disposed rollers on which the said endless element is mounted and gearing for transmitting motion from the said endless element to the wheels of the frame.

4. A motor wheel frame having its wheels disposed transversely to permit lateral movement of the frame and means carried by the frame for transmitting motion from the drive wheel of a motor vehicle to the wheels of the device including transverse rollers mounted on the frame, a link belt arranged on the said rollers and forming a seat for the drive wheel and gearing connected with one of the rollers and with the whels of the frame.

5. A motor vehicle turning device including a wheeled frame having its wheels arranged transversely to permit lateral movement of the frame and means carried by the frame for transmitting motion from the drive wheel of a motor vehicle to the wheels of the device, said means including transversely disposed rollers having large inwardly tapered guiding portions, an endless wheel receiving element arranged on the rollers and gearing for transmitting motion from one of the rollers to the wheels of the frame.

6. A motor vehicle turning device including a wheeled frame having its wheels arranged transversely to permit lateral movement of the frame and means carried by the frame for transmitting motion from the drive wheel of a motor vehicle to the wheels of the device, said means including transversely disposed rollers mounted in the frame in spaced relation and having inwardly tapered terminal guiding portions, an endless wheel receiving element arranged on the rollers, side plates mounted on the frame and having downwardly and inwardly curved portions located between the terminal portions of the rollers and gearing for transmitting motion from the rollers to the wheels of the frame.

7. A motor vehicle turning device including a wheeled frame having its wheels arranged transversely to permit lateral movement of the frame and means carried by the frame for transmitting motion from the drive wheel of a motor vehicle to the wheels of the device, said means including transversely disposed rollers mounted in a frame, an endless wheel receiving element arranged on the rollers, gearing for transmitting motion from the rollers to the wheels of the frame and a stop roller located above and in rear of the endless wheel receiving element, arranged to be engaged by the drive wheel of a motor vehicle.

8. A motor vehicle turning device including a wheeled frame having its wheels arranged transversely to permit lateral movement of the frame and means carried by the frame for transmitting motion from the drive wheel of a motor vehicle to the wheels of the device, said means including transversely disposed rollers mounted in a frame, an endless wheel receiving element arranged on the rollers, gearing for transmitting motion from the rollers to the wheels of the frame, and a stop roller located above and in rear of the endless wheel receiving element, arranged to be engaged by the drive wheel of a motor vehicle, said stop roller having inwardly tapered terminal guiding portions.

9. A motor vehicle turning device including a wheeled frame having its wheels arranged transversely to permit lateral movement of the frame and means carried by the frame for transmitting motion from the drive wheel of a motor vehicle to the wheels of the device, said means including transversely disposed rollers mounted in a frame, an endless wheel receiving element arranged on the rollers, gearing for transmitting motion from the rollers to the wheels of the frame, and a pivotally mounted approach plate arranged in advance of the wheel receiving element for guiding the drive wheel onto the said element.

10. A motor vehicle turning device including a wheeled frame having its wheels arranged transversely to permit lateral movement of the frame and means carried by the frame for transmitting motion from the drive wheel of a motor vehicle to the wheels of the device, said means including transversely disposed rollers mounted in a frame, an endless wheel receiving element arranged on the rollers, gearing for transmitting motion from the rollers to the wheels of the frame, a stop roller mounted in the frame and located above and in rear of the said wheel receiving element and an approach plate located in advance of said element and pivotally mounted at a point between its front and rear edges.

11. A motor vehicle turning device including a wheeled frame and means carried by the frame for receiving the drive wheel of a vehicle and for transmitting motion from the same to the wheels of the device, said means including transverse rollers having enlarged inwardly tapered guiding portions, an endless wheel receiving element arranged on the rollers and arranged to receive and support the drive wheel and gearing for transmitting motion from the rollers to the wheels of the frame.

In testimony whereof I have hereunto set my hand.

ALBERT GEORGE MOLNIAR.